(12) United States Patent
Nakajima et al.

(10) Patent No.: US 7,913,271 B2
(45) Date of Patent: Mar. 22, 2011

(54) BROADCAST PROGRAM PROCESSING APPARATUS, COMPUTER SYSTEM, BROADCAST PROGRAM EVALUATION SYSTEM, AND COMPUTER PROGRAM

(75) Inventors: Yasuhisa Nakajima, Kanagawa (JP); Kohei Endo, Saitama (JP)

(73) Assignee: Sony Corporation, Tokyo (JP)

( * ) Notice: Subject to any disclaimer, the term of this patent is extended or adjusted under 35 U.S.C. 154(b) by 1133 days.

(21) Appl. No.: 10/477,071

(22) PCT Filed: May 10, 2002

(86) PCT No.: PCT/JP02/04580
§ 371 (c)(1),
(2), (4) Date: Jun. 7, 2004

(87) PCT Pub. No.: WO02/093909
PCT Pub. Date: Nov. 21, 2002

(65) Prior Publication Data
US 2004/0221325 A1    Nov. 4, 2004

(30) Foreign Application Priority Data

May 10, 2001   (JP) .................................. 2001-139455

(51) Int. Cl.
| | |
|---|---|
| H04H 60/33 | (2008.01) |
| H04N 7/173 | (2006.01) |
| H04N 7/10 | (2006.01) |
| H04N 7/025 | (2006.01) |
| H04N 5/445 | (2006.01) |
| G06F 3/00 | (2006.01) |
| G06F 13/00 | (2006.01) |

(52) U.S. Cl. ................ 725/24; 725/13; 725/32; 725/37; 725/105

(58) Field of Classification Search .................... 725/24
See application file for complete search history.

(56) References Cited

U.S. PATENT DOCUMENTS

| | | | | |
|---|---|---|---|---|
| 5,485,518 | A | * | 1/1996 | Hunter et al. ................ 725/28 |
| 5,530,469 | A | | 6/1996 | Garfinkle |
| 5,790,935 | A | * | 8/1998 | Payton ........................ 725/91 |
| 6,757,906 | B1 | * | 6/2004 | Look et al. ................... 725/45 |
| 6,782,551 | B1 | * | 8/2004 | Entwistle ..................... 725/46 |
| 6,842,860 | B1 | * | 1/2005 | Branstad et al. ............ 713/170 |
| 6,898,762 | B2 | * | 5/2005 | Ellis et al. .................. 715/716 |
| 7,007,294 | B1 | * | 2/2006 | Kurapati ..................... 725/53 |
| 7,096,486 | B1 | * | 8/2006 | Ukai et al. ................... 725/58 |

(Continued)

FOREIGN PATENT DOCUMENTS

EP         0 929 197        7/1999

(Continued)

*Primary Examiner* — Christopher Kelley
*Assistant Examiner* — Justin E Shepard
(74) *Attorney, Agent, or Firm* — Frommer Lawrence & Haug LLP; William S. Frommer; Thomas F. Presson

(57) ABSTRACT

A broadcast program processing apparatus that enables a user to acquire evaluation data provided by others who have already watched a broadcast program when the user intends to play back the recorded broadcast program. A broadcast program receiving apparatus records the broadcast program. Before playing back the broadcast program, the broadcast program receiving apparatus acquires the evaluation data concerning the broadcast program provided by others using a cell phone unit. The acquired evaluation data is outputted in connection with the recorded broadcast program. The user can determine whether he or she wants to watch the broadcast program with reference to the evaluations made by others.

12 Claims, 13 Drawing Sheets

U.S. PATENT DOCUMENTS

| | | | |
|---|---|---|---|
| 7,113,917 B2 * | 9/2006 | Jacobi et al. | 705/14 |
| 7,254,605 B1 * | 8/2007 | Strum | 709/203 |
| 7,284,064 B1 * | 10/2007 | Connelly | 709/231 |
| 2002/0016910 A1 * | 2/2002 | Wright et al. | 713/150 |
| 2002/0169823 A1 * | 11/2002 | Coulombe et al. | 709/203 |

FOREIGN PATENT DOCUMENTS

| | | |
|---|---|---|
| EP | 0 548 286 | 4/2000 |
| EP | 1 041 821 | 10/2000 |
| JP | 9-261609 | 10/1997 |
| JP | 10-136312 | 5/1998 |
| JP | 10-248094 | 9/1998 |
| JP | 11-88863 | 3/1999 |
| JP | 2001-111984 | 4/2001 |
| JP | 2001-320743 | 11/2001 |
| WO | WO 99 04561 | 1/1999 |
| WO | WO 00 11869 | 3/2000 |
| WO | WO 00 59223 | 10/2000 |
| WO | WO 01 13553 | 2/2001 |
| WO | WO 01 15449 | 3/2001 |

* cited by examiner

FIG. 6

|       | RECORDING TIME            | TITLE |
|-------|---------------------------|-------|
| No. 1 | YY/MM/DD<br>7:00 — 8:00   | ○○○   |
| No. 2 | YY/MM/DD<br>13:00 — 14:00 | ×××   |

FIG. 7

DETAILS OF RECORDED PROGRAM

TITLE: ○○○○
CAST: ××△△
BRIEF
DESCRIPTION:
_____

_____

_____

| VIEWER EVALUATION |

130

US 7,913,271 B2

BROADCAST PROGRAM PROCESSING APPARATUS, COMPUTER SYSTEM, BROADCAST PROGRAM EVALUATION SYSTEM, AND COMPUTER PROGRAM

TECHNICAL FIELD

The present invention relates to broadcast program processing apparatuses, computer systems, and so on.

BACKGROUND ART

Heretofore, broadcast programs for television, which are transmitted as satellite or terrestrial signals, for example, by a broadcast station, are received by receiving apparatuses in individual homes, while being concurrently with broadcasting, to be watched on a TV apparatus or the like. To watch the broadcast program, a viewer can play back a broadcast program that he or she intends to watch, which has been recorded on a video tape or saved as digital data in a PC (personal computer). In a method for recording broadcast programs as digital data, for example, motion pictures are compressed into the MPEG-2 (moving picture experts group) format and are saved in an HDD (hard disk) or the like within the PC. When the viewer plays back the saved broadcast program to watch it, the compressed data concerning the broadcast program is outputted as video and voice data from an MPEG decoder and is played back.

Meanwhile, when the viewer intends to watch the broadcast program, he or she selects a favorite broadcast program to watch it, from among a large number of broadcast programs provided from a plurality of broadcast stations almost all day, with reference to comments on a program schedule and so on. However, the comments on the program schedule are not enough for the viewer to determine whether the broadcast program that he or she intends to watch suits his/her taste. It is often the case that, after watching the broadcast program, the viewer has the impression that the broadcast program did not suit his/her taste.

An object of the present invention is to refer to evaluations made by others who have already watched a broadcast program when watching the recorded broadcast program, thereby resolving the above-described technical problems.

DISCLOSURE OF INVENTION

In order to achieve the above object, a broadcast program processing apparatus of the present invention is characterized in that a user can refer to evaluations of a broadcast program made by others when he or she plays back the recorded broadcast program. Specifically, when the user plays back the broadcast program recorded in a recording unit of a broadcast program processing apparatus to watch it, he or she acquires the evaluations made by others of the broadcast program through an acquiring unit over a network. Since the acquired evaluations made by others are outputted by an outputting unit in connection with broadcast program, by referring to the outputted evaluations, the user can determine whether he or she will play back the broadcast program to watch it. The network may be the Internet or a wired or wireless telephone network, and is not particularly limited.

The broadcast program processing apparatus may have a memory such as an HDD, and the broadcast program may be recorded as digital data in the memory in the recording unit. Identification information concerning the broadcast program stored in the memory can be transmitted over the network, and evaluation data corresponding to the identification information can be acquired by the acquiring unit. The identification information means information for identifying the broadcast program, such as information for determining a broadcast station, the broadcast date, and so on. One unit for the broadcast program may be a specified broadcast program, and the time unit for the broadcast program, for example, by the minute or by the hour, is not particularly limited.

After the user watches the broadcast program, evaluation result data concerning the broadcast program can be transmitted from a transmitting unit of the broadcast program processing apparatus over the network. The evaluation result data transmitted here is used as new evaluation data provided to other users.

Another embodiment of the present invention is a computer system capable of transmitting to and receiving from a user terminal evaluation data concerning a broadcast program. Specifically, the computer system acquires evaluation result data concerning the broadcast program provided from a plurality of viewers by acquiring means. A large amount of acquired evaluation result data is compiled into the evaluation data. The evaluation data is transmitted to the user terminal from transmitting means in response to a request from the user terminal of a user who intends to record and watch the broadcast program.

With this computer system, evaluations of the broadcast program provided by viewers who have already watched the broadcast program can be efficiently compiled, and the compiled evaluation data can be smoothly provided to the user. One example of such a computer system is a server. The server may be a stand-alone server or may include a plurality of functionally distributed servers. The request from the user terminal includes a connect request from the user terminal to the computer system and an acquisition request and a send request for the evaluation data from the user terminal.

The computer system may include identification information acquiring means for acquiring identification information concerning the broadcast program that the user intends to watch from the user terminal. The evaluation data concerning the broadcast program can be transmitted from the transmitting means to the user terminal based on the acquired identification information. As described above, transmission of the evaluation data concerning the broadcast program designated by the user terminal to the user terminal enables efficient transmission of evaluation information required by the user to the user terminal.

The transmitting means may periodically transmit the evaluation data concerning a plurality of broadcast programs to the user terminal. In this case, since the evaluation data concerning a plurality of broadcast programs is transmitted, it is preferable for the user to select the necessary evaluation data on the user terminal. "Periodically" means that the period can be arbitrarily set at the user side or the computer system side. Specifically, it means every few hours, at a specified time every day, at a specified time on a specified day of the week, and so on.

Still another embodiment of the present invention is an evaluation processing system of a broadcast program including a terminal for audio-visually processing the recorded broadcast program and a server capable of transmitting to and receiving from the terminal evaluation data concerning the broadcast program. Specifically, the server stores the evaluation data concerning the broadcast program provided by a viewer using storing means, and transmits the evaluation data in response to a request from the terminal from server-side transmitting means to the terminal. The terminal acquires the evaluation data from the server by acquiring means, and outputs the acquired evaluation data in connection with identification information concerning the recorded broadcast program from transmitting means. In this manner, communication of the evaluation data concerning the broadcast program between the server and the terminal can be considered as one type of information providing service. The service provided by the server to a user may be a pay service or a free service.

The terminal of the evaluation processing system of a broadcast program may include inputting means for inputting an evaluation result of a broadcast program that was already watched and terminal-side transmitting means for transmitting data concerning the inputted evaluation result to the server. The evaluation result inputted by the user may be stored in the server together with the existing evaluation results and may be provided to other users as new evaluation data.

The server of the evaluation processing system of a broadcast program may include authentication means for authenticating that the user is registered in the server in response to a request from the terminal. The evaluation data concerning the broadcast program can be transmitted to and received from the authenticated user. When the evaluation processing system of a broadcast program is provided as a pay service, it is necessary to confirm that the user is a contracting user. Even when the system is not provided as a pay service, transmission and reception of the evaluation data with the user identified can avoid duplicate registration of the evaluation result by the same user and so on.

When the server has the authentication means, the server may include customer management means for adding privilege points to information, which is stored in the server, concerning the user of the terminal which has transmitted evaluation result data. The server can provide a privilege such as money and goods in accordance with the privilege points in order to encourage the user to transmit the evaluation data.

Still another embodiment of the present invention is a computer program for processing evaluation information concerning a broadcast program. Specifically, the computer program is executed in a computer system connectable to a network. The computer system has a function for acquiring evaluation data concerning the broadcast program given by a viewer over the network and a function for outputting the evaluation data corresponding to the broadcast program recorded therein together with information identifying the broadcast program. With such a computer program, a user can receive the evaluation data concerning the broadcast program and can record evaluation results on the server and so on, using a PC already owned by the user, which is connectable to a network, without purchasing a new apparatus.

The information identifying the broadcast program here is, for example, information that has title information of the broadcast program. However, the information identifying the broadcast program is not limited to such information and may be a broadcast station of the broadcast program or the broadcast date thereof.

BRIEF DESCRIPTION OF THE DRAWINGS

FIG. 6 shows an example of a display screen indicating the recorded broadcast program.

FIG. 7 shows an example of an evaluation information display screen.

FIGS. 9A and 9B show examples of the evaluation information display screen after the broadcast program is watched, wherein FIG. 9A shows the display screen when voting for an evaluation, and FIG. 9B shows the display screen when selecting an evaluation comment.

BEST MODE FOR CARRYING OUT THE INVENTION

Embodiments of the present invention will now be described in detail with reference to the accompanying drawings.

Figure 1:
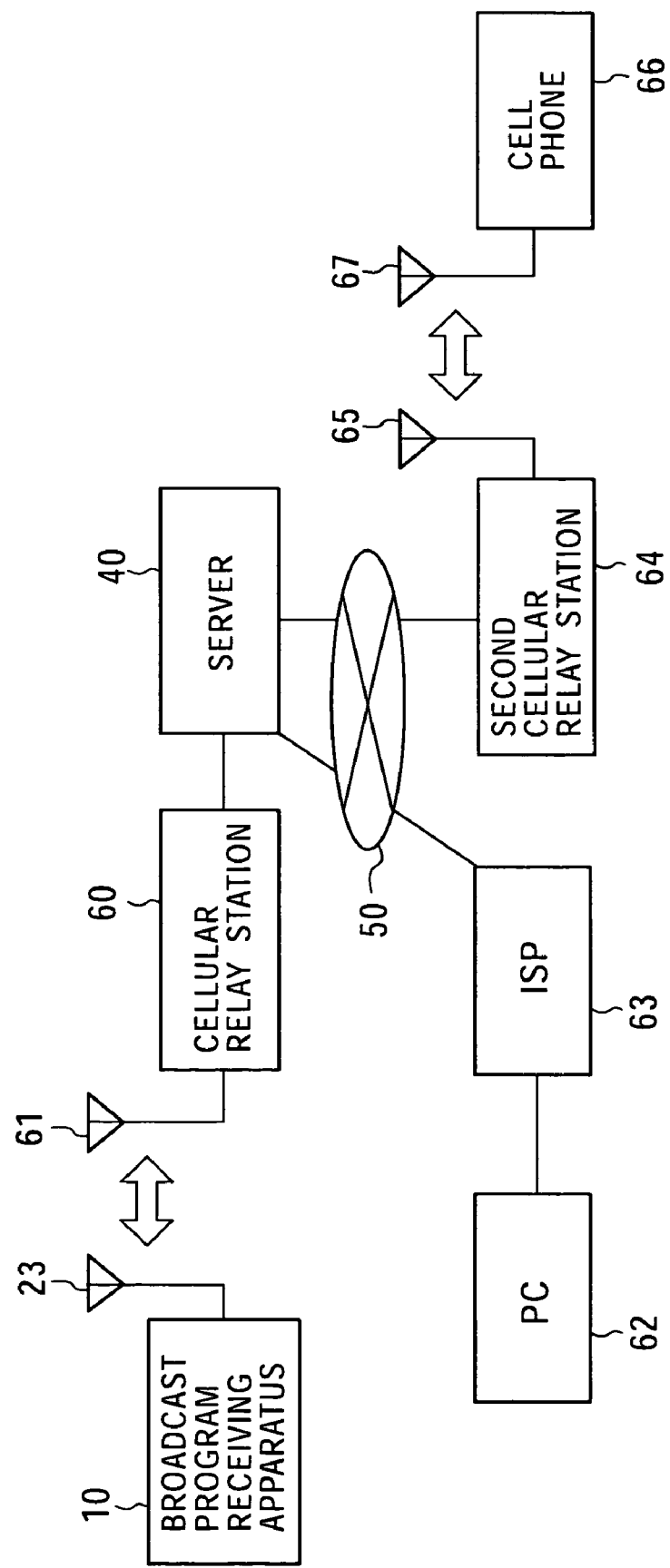
FIG. 1 is a block diagram illustrating transmission and reception of evaluation information between each terminal and a server in an evaluation processing system of a broadcast program.

FIG. 1 is a block diagram illustrating an evaluation processing system of a broadcast program according to an embodiment of the present invention.

The evaluation processing system of a broadcast program shown in FIG. 1 includes a broadcast program receiving apparatus 10, which is a terminal used by a user, a PC 62, and a mobile telephone terminal (hereinafter referred to as a cell phone) 66. The system further includes a server 40 for receiving information from the user and for supplying the user with the information, and a cellular relay station 60 acting as an intermediary when sending or receiving the information between the broadcast program receiving apparatus 10 and the server 40. The evaluation processing system furthermore includes the Internet 50 and an ISP (internet service provider) 63, acting as intermediaries when sending or receiving the information between the PC 62 and the server 40, and a second cellular relay station 64 acting as an intermediary when sending or receiving the information between the cell phone 66 and the server 40.

In the evaluation processing system of broadcast programs shown in FIG. 1, evaluation information or evaluation data concerning the broadcast programs provided by a plurality of viewers are stored in the server 40. The user accesses to the server 40 through the broadcast program receiving apparatus 10, the PC 62, the cell phone 66, or the like, each serving as a terminal, and receives the evaluation data from the server 40. Specifically, the user who intends to watch a recorded broadcast program can easily decide whether he or she will play back the broadcast program to watch it, based on evaluations by others who have already watched the broadcast program, the evaluations being stored in the server 40. The evaluations mean impressions or criticisms, for example, that the broadcast program is recommended, that it is not recommended, that the actor's performances in the broadcast program are appreciated, or that viewers are impressed. After watching the broadcast program, the user evaluates the broadcast program and registers the evaluation data on the server 40 using the terminal.

Figure 2:
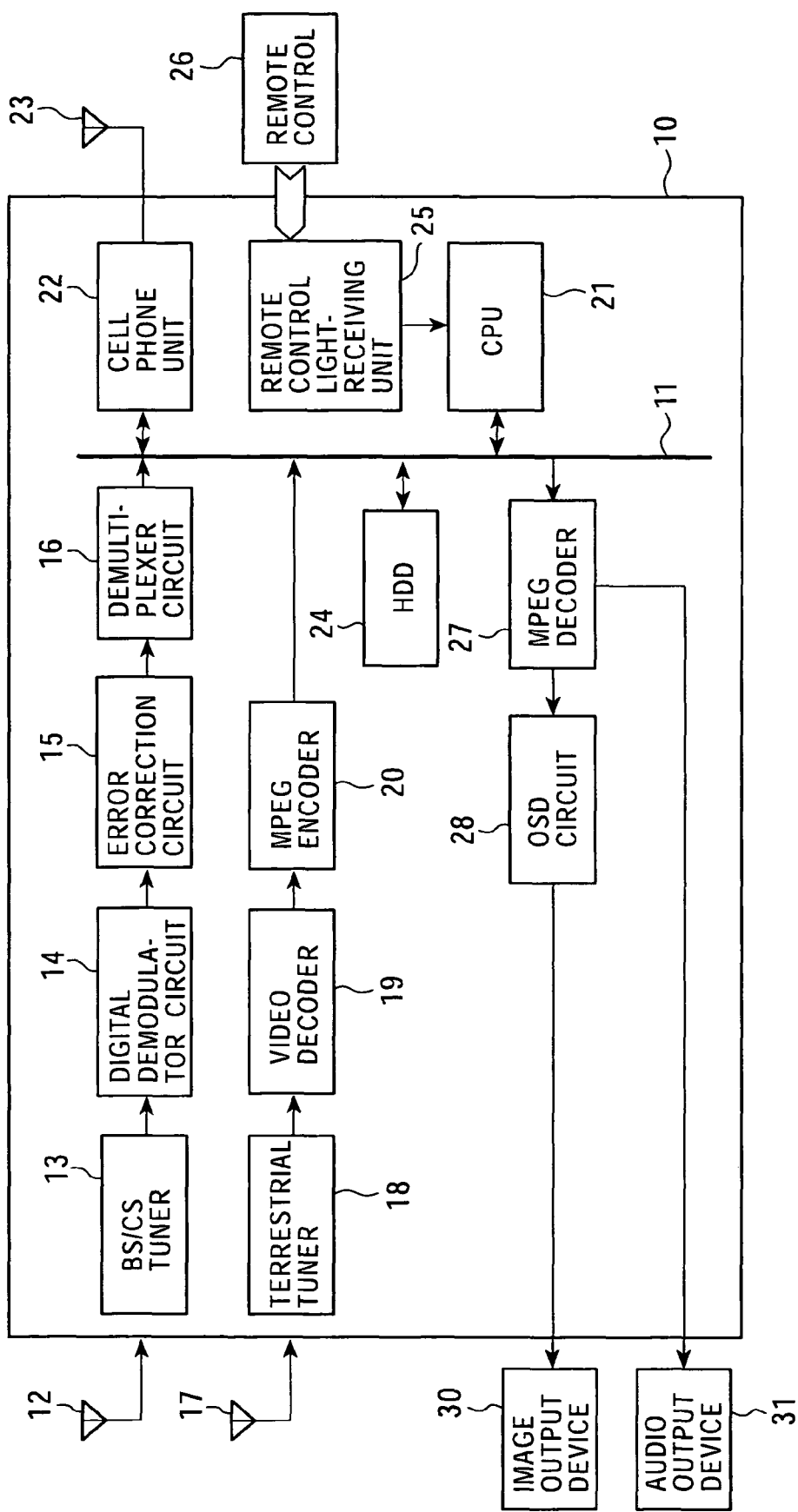
FIG. 2 is a block diagram illustrating a television broadcast program receiving apparatus 10, serving as a broadcast program processing apparatus, according to an embodiment of the present invention.

FIG. 2 is a block diagram illustrating the broadcast program receiving apparatus (broadcast program processing apparatus) 10 for television, serving as a terminal for the user.

The broadcast program receiving apparatus 10 can process TV broadcast programs for satellite digital broadcasting and terrestrial analog broadcasting. The broadcast program receiving apparatus 10 includes a BS (broadcasting satellite)/CS (communication satellite) tuner 13 for processing satellite signals, a digital demodulator circuit 14, an error correction circuit 15, and a demultiplexer circuit 16. The apparatus 10 further includes a terrestrial tuner 18 for processing a terrestrial signal, a video decoder 19, and an MPEG encoder 20. In order to record and play back the received broadcast program, to process the evaluation information thereof, and so on, the broadcast program receiving apparatus 10 includes a CPU (central processing unit) 21, an HDD 24, an MPEG decoder 27, an OSD (on screen display) circuit 28, and a system bus 11. It further includes a remote control light receiving unit 25 for receiving instructions from the user through a remote controller 26. Although FIG. 2 illustrates the case where the terrestrial analog broadcasting is received as terrestrial broadcasting, the broadcast program receiving apparatus 10 may include a receiving circuit capable of receiving terrestrial digital broadcasts, which will be introduced in the future.

The broadcast program receiving apparatus 10 records the broadcast program by saving data based on the signals received from a television broadcast station on the HDD 24 serving as a recording unit. However, other means that can record broadcast programs may be used in place of the HDD 24. The HDD 24 may be replaced, for example, with a memory (storage means) that is capable of recording the broadcast program as digital data, such as a CD (compact disc) or a DVD (digital versatile disc), or with an analog video tape.

The broadcast program receiving apparatus 10 further includes a cell phone unit 22, as a data acquiring and sending unit, for sending and receiving data concerning the evaluations to and from the server 40. The cell phone unit 22 connects to the cell phone of the user and includes an interface section through which the data can be transmitted to and received from the cell phone. The data transmission and reception between the server 40 and the broadcast program receiving apparatus 10 is performed through the cell phone connected to the cell phone unit 22. When using a wire telephone, a wire telephone unit such as a modem can be used in place of the cell phone unit 22. In this case, the information can be transmitted to and received from the server 40 via a telephone network. Furthermore, since the broadcast program receiving apparatus 10 has network connection capabilities, the information may be transmitted to and received from the server 40 via a network.

Terminals that the user can use in the transmission and reception of the evaluation data concerning the broadcast program include the PC 62 and the cell phone 66 shown in FIG. 1.

A commonly-used mobile phone and preferably a mobile phone that can be connected to the server 40 over the Internet 50 can be used as the cell phone 66. In the latter case, the evaluation data can be easily transmitted to and received from the server 40. When the connection to the server 40 is not implemented over the Internet 50, the evaluation data can be transmitted to and received from a call center (not shown) or the like connected to the server 40 by voice or push-button tones.

The PC 62 is configured so as to be connectable to the Internet 50 and may be a commonly-used PC. It can include a display, a keyboard, a unit including a CPU and an HDD capable of recording the broadcast program, a device for connecting to the Internet 50, and so on.

Since the PC 62 or the cell phone 66, when used as the terminal, does not have means for receiving and recording the broadcast program, unlike the broadcast program receiving apparatus 10, the user can use other apparatuses to receive and record the broadcast program. For example, the broadcast program received using a commonly-used TV apparatus may be recorded on video equipment or the like. The broadcast program may be received through the PC 62 and recorded on the PC's built-in memory or on an external memory. Additionally, the broadcast program receiving apparatus 10 may be used without the cell phone unit 22.

Figure 3:
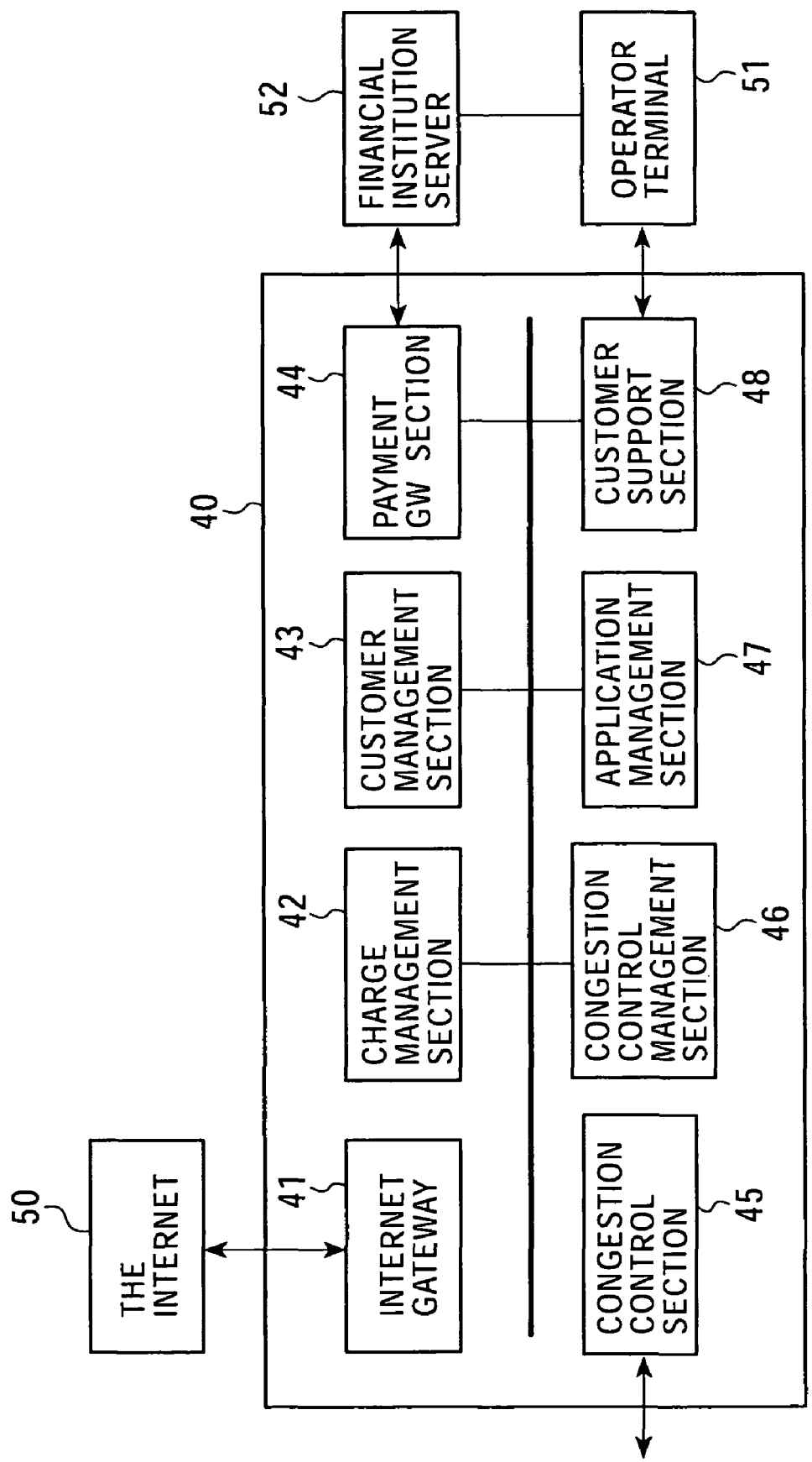
FIG. 3 is a block diagram showing the specific configuration of a server 40 of a service provider used in an evaluation information providing service of the broadcast program.

FIG. 3 is a block diagram showing the configuration of the server 40. The server 40 includes a congestion control section 45 for controlling congestion in the transmission and reception of the evaluation data to and from the terminal; a congestion control management section 46 for managing the congestion control; an application management section 47 for processing the evaluation information; a customer support section 48 for receiving an input from an operator terminal 51; an internet gateway section 41 for connecting to the Internet 50; a charge management section 42; a customer management section 43; and an accounting gateway section (hereinafter referred to as a payment GW section) 44 for communicating with an external financial institution server 52. The application management section 47 includes a database section (not shown), in which the evaluation data concerning the broadcast program is stored.

Figure 4:
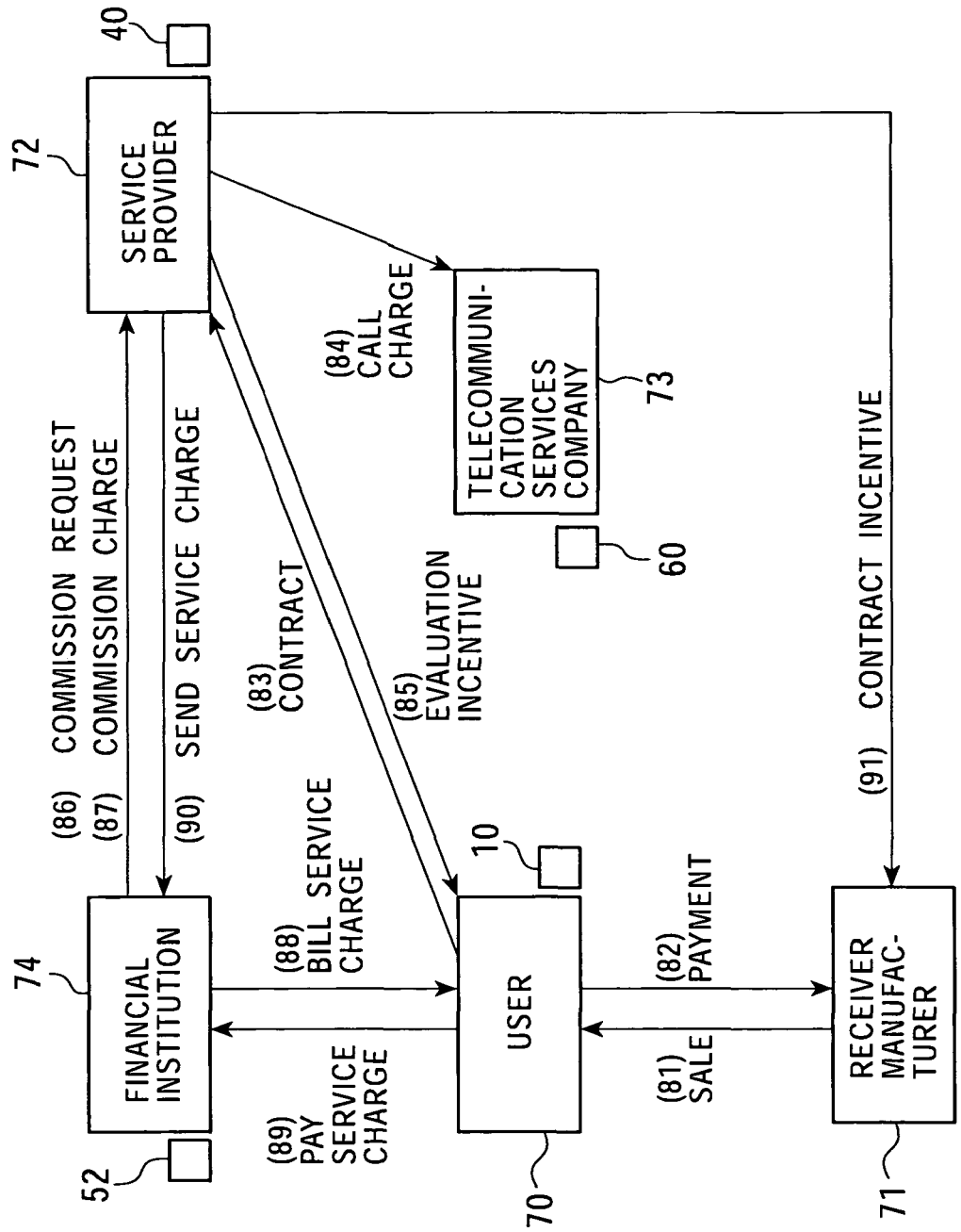
FIG. 4 is a block diagram illustrating one type of an evaluation information service of the broadcast program.

FIG. 4 is a block diagram showing a sample pattern for providing an evaluation information service of the broadcast program, in which the server 40 and the broadcast program receiving apparatus 10 serving as the terminal for the user are used.

A user 70 receiving the service purchases the broadcast program receiving apparatus 10 sold by a receiver manufacturer 71, as shown by (81) in FIG. 4, and pays the purchase charge thereof, as shown by (82) in FIG. 4. As shown by (83) in FIG. 4, the user 70 can enter into a contract for the service with a service provider 72 if required. After entering into contract, the user 70 is registered in the server 40 as a subscriber to the service provided by the service provider 72. When the receiver manufacturer 71 sells the broadcast program receiving apparatus 10 to the user 70, the receiver manufacturer 71 may act as an intermediary for the contract between the service provider 72 and the user 70. In this case, the service provider 72 may pay a cash reward as a contract incentive to the receiver manufacturer 71 in accordance with the contract with the user 70, as shown by (91) in FIG. 4.

The evaluation information concerning the broadcast program is supplied by the service provider 72 via the server 40 to the broadcast program receiving apparatus 10 of the user 70 and is stored in the server 40. At this time, the service provider 72 sends the evaluation data concerning the broadcast program to a telecommunication services company 73 and pays a call charge to the telecommunication services company 73, as shown by (84) in FIG. 4. The evaluation data concerning the broadcast program from the server 40 is received by the broadcast program receiving apparatus 10. The user 70 operates the broadcast program receiving apparatus 10 to obtain the evaluation information concerning the broadcast program. The telecommunication services company 73 corresponds to the cellular relay station 60 in FIG. 1 when the broadcast program receiving apparatus 10 is used; whereas it corresponds to the ISP 63 or the second cellular relay station 64 when other terminals are used.

In contrast, when the user 70 evaluates an already watched broadcast program, the user 70 inputs the evaluations into the broadcast program receiving apparatus 10, which sends the evaluation results to the service provider 72. The service provider 72 compiles the received evaluation results and provides an evaluation incentive so as to afford an incentive to the user 70 who makes an evaluation to transmit the evaluation data, as shown by (85) in FIG. 4. The evaluation incentive includes addition of privilege points, provision of goods, and offering of privileges such as discounts.

The service provider 72 requests a financial institution 74, such as a bank, to act as an agent for billing the user 70 for a service charge, as shown by (86) in FIG. 4, and pays a commission charge to the financial institution 74 (87). The financial institution 74 bills the user 70 for the service charge, as shown by (88) in FIG. 4. The user 70 pays the billed service charge to the financial institution 74, as shown by (89) in FIG. 4. The financial institution 74 sends the service charge entrusted by the user 70 to the service provider 72, as shown by (90) in FIG. 4.

The server 40 includes a customer support section 48 serving as a window for inquiries from the user 70 about the service provided by the service provider 72 and so on. Input jobs (such as various settings in the service, registration of user information to a database, and modification of the user information in the database) from the operator terminal 51 can be processed in the customer support section 48.

The flow of transmitting and receiving the evaluation data between each terminal (the broadcast program receiving apparatus 10, the PC 62, or the cell phone 62) and the server 40, which is important in providing the services described above, will now be specifically described.

First, the user must record the broadcast program received by the broadcast program receiving apparatus 10 on the HDD 24 when he or she uses the evaluation information service of the broadcast program. In the case of a satellite broadcast program, an IF (intermediate frequency) BS/CS signal inputted from a BS antenna 12 is converted to the baseband by the BS/CS tuner 13 and is inputted to the digital demodulator circuit 14. After the demodulated signal is corrected in the error correction circuit 15, a required video signal and audio signal are extracted by the demultiplexer circuit 16. The extracted video signal and audio signal are recorded on the HDD 24 via the system bus 11. As in the case of the broadcast program of the terrestrial analog broadcasting, the signal inputted from a terrestrial antenna 17 is demodulated by the terrestrial tuner 18 and is then digitized by the video decoder 19. The digitized signal is compressed into the MPEG-2 format in the MPEG encoder 20 and is recorded on the HDD 24 via the system bus 11.

The broadcast program selected from among predesignated broadcast programs may be recorded on the HDD 24. For example, the user may designate individual programs based on a program schedule. It is also possible to perform setting so that the broadcast program to be recorded is automatically selected according to the category specified by the user. Or all of the broadcast programs may be recorded. The user can issue a command to record the broadcast programs using the remote control 26. One unit for recording the broadcast programs may be a broadcast program or it may be arbitrarily set, for example, by the minute or by the hour. The signal submitted through button operation of the remote control 26 for recording reservation is received by the remote control light-receiving unit 25 of the broadcast program receiving apparatus 10, from which it is transmitted to the CPU 21. The instruction from the user is displayed in an image output device 30 connected to the broadcast program receiving apparatus 10 through processing in the CPU 21, and this instruction can be confirmed based on the displayed information. Then, the broadcast program is processed for recording by the CPU 21.

When the user watches the broadcast program recorded as described above, he or she acquires from the server 40 the evaluation data by others who have already watched the broadcast program.

Figure 5:
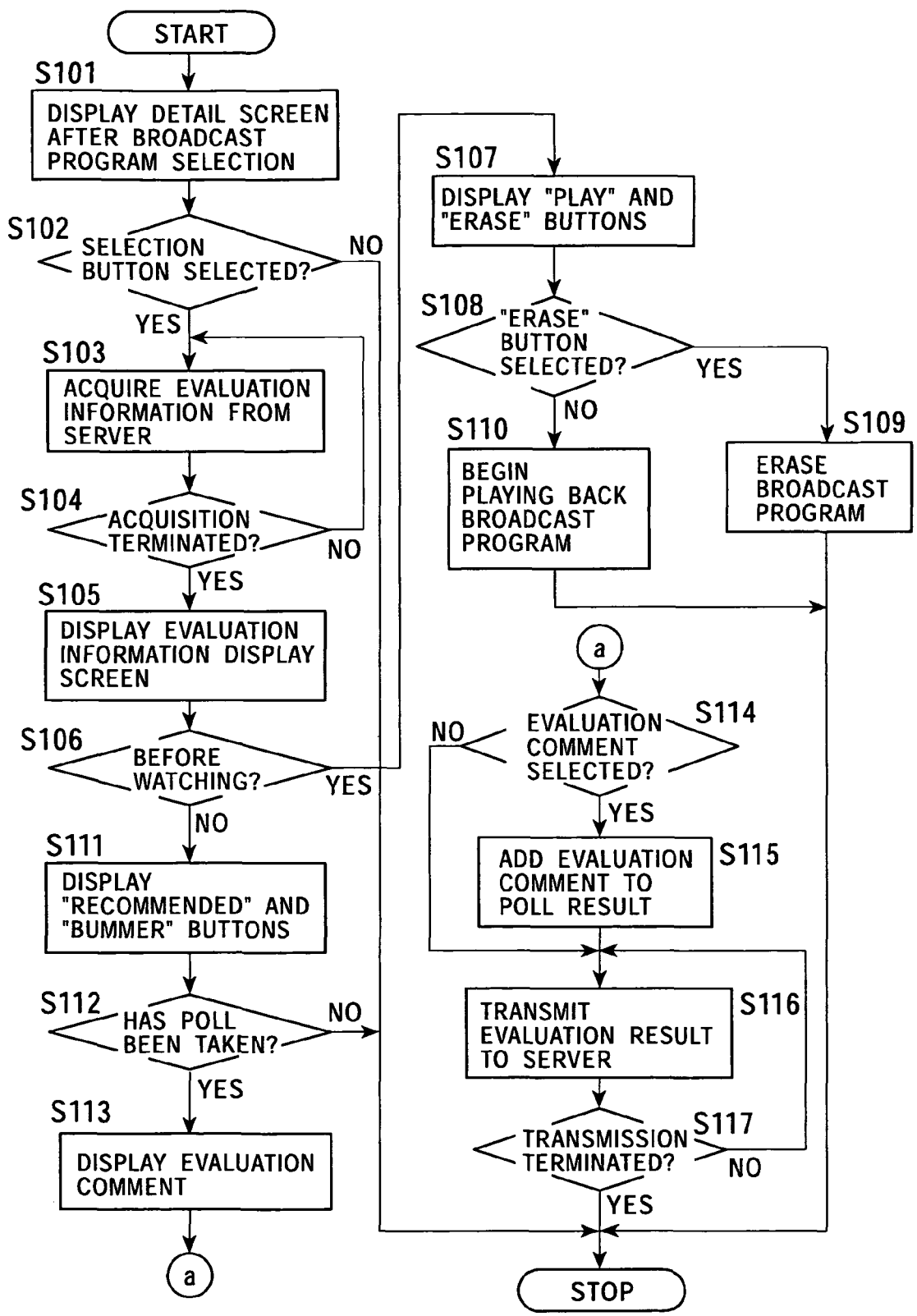
FIG. 5 is a flowchart showing the process flow in the broadcast program receiving apparatus 10 shown in FIG. 2.

FIG. 5 is a flowchart showing the process flow in the broadcast program receiving apparatus 10 shown in FIG. 1.

First, before the evaluation data is acquired from the server 40, a display screen that provides a list of broadcast programs already recorded on the HDD 24, for example, a list of recording times and titles of the broadcast programs, as shown in FIG. 6, is displayed on the image output device 30 through the operation of the remote control 26 by the user (Step S101). The user selects and designates the broadcast program to be watched from among the broadcast programs displayed on the screen through the operation of the remote control 26. Detailed information (title, cast, brief description, and so on) concerning the selected broadcast program, as shown in FIG. 7, is displayed on the screen. At the bottom part of the screen, a selection button 130 for providing an evaluation information display screen of the broadcast program is displayed.

Next, the broadcast program receiving apparatus 10 determines whether the user has selected the selection button 130 (Step S102). Specifically, the CPU 21 recognizes and determines via the remote control light-receiving unit 25 the signal which is provided by the user through the button operation of the remote control 26 corresponding to the selection button 130. When the user has not selected the selection button 130, the process terminates. When the user has selected the selection button 130 to display the evaluation information display screen, the broadcast program receiving apparatus 10 is connected to the server 40 via a cell phone antenna 23 connected to the cell phone unit 22 in order to acquire the evaluation information from the server 40 (Step S103). Data (identification information for identifying the broadcast date or a broadcast station) that identifies the broadcast program currently selected to be watched is transmitted from the cell phone antenna 23 connected to the cell phone unit 22 to the server 40 via the cellular relay station 60, as shown in FIG. 1. As a result, the evaluation data transmitted from the server 40 is received by the cell phone antenna 23 and downloaded into the broadcast program receiving apparatus 10 via the cell phone unit 22. The evaluation data to be received is not limited only to the evaluation information concerning a specified broadcast program. For example, after the evaluation data concerning all of the broadcast programs is acquired, the evaluation data corresponding to the broadcast program selected to be watched may be identified and displayed in the broadcast program receiving apparatus 10.

Figure 8:
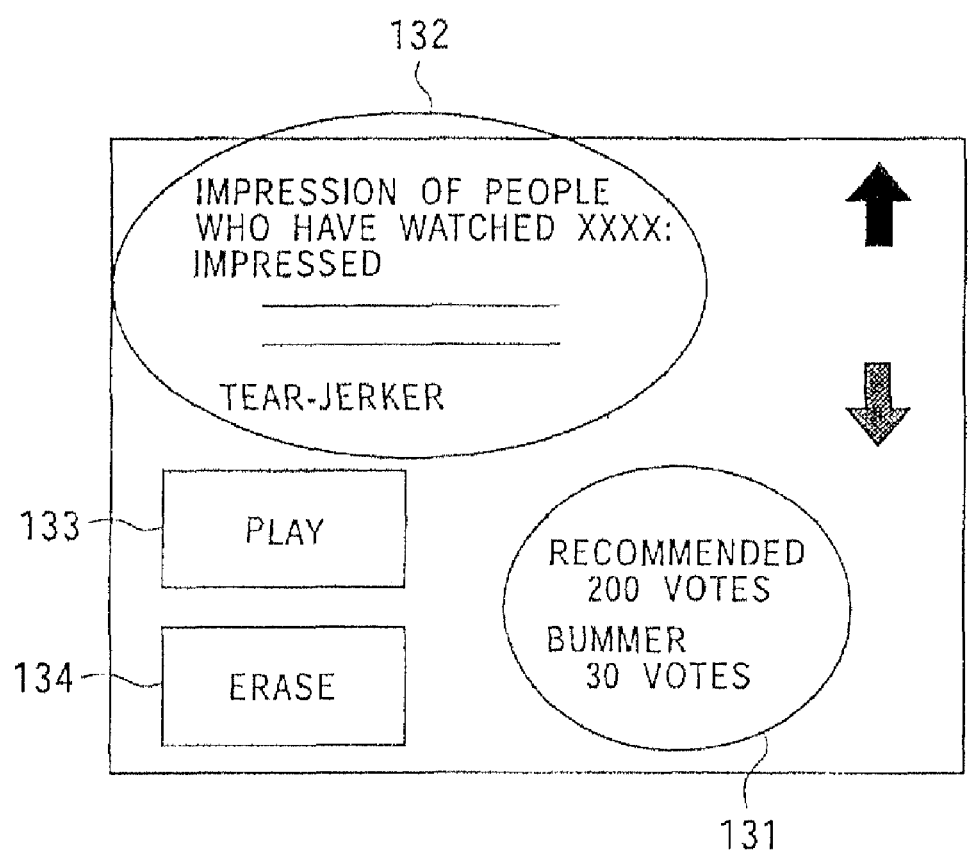
FIG. 8 shows an example of the evaluation information display screen before the broadcast program is watched.

The broadcast program receiving apparatus 10 determines whether the evaluation data transmitted from the server 40 is acquired (Step S104). When the acquisition is not completed, the apparatus 10 repeats the job (Step S103) for transmitting the acquisition request for the evaluation data. When the evaluation data is acquired, it is displayed on the evaluation information display screen, which is inserted by the OSD circuit 28, by the image output device 30 (Step S105). One example of the evaluation information display screen is shown in FIG. 8, in which poll results 131 showing the number of votes for predetermined standard comments such as "Recommended" and "Bummer", and specific evaluation comments 132 by viewers, such as "Impressed" and "Tearjerker", are inserted as the evaluation information in a prepared form by the OSD circuit 28.

The broadcast program receiving apparatus 10 determines whether the displayed evaluation data is for a broadcast program that has not been watched by the user or for a broadcast program that has already been watched (Step S106). For example, when the broadcast program recorded on the HDD 24 has already been played back, this determination can be made based on the information that the broadcast program has been played back, which is preset so as to be included in the identification information. When the broadcast program receiving apparatus 10 determines that the evaluation data is for a broadcast program that has not been watched by the user, a Play button 133 and an Erase button 134 are additionally displayed at the bottom part of the evaluation information display screen by the OSD circuit 28, as shown in FIG. 8 (Step S107). Next, the broadcast program receiving apparatus 10 determines whether the user has selected the Erase button 134 on the evaluation information display screen through the button operation of the remote control 26 (Step S108). When the user has not selected the Erase button 134, playback of the broadcast program begins (Step S110). The playback of the broadcast program is performed by reading out a video and voice data recorded on the HDD 24 by the MPEG decoder 27 and outputting them by the externally provided image output device 30 and an externally provided audio output device 31. When the user has selected the Erase button 134, the selected broadcast program is erased from the HDD 24 (Step S109) and the process terminates.

Figure 9A:
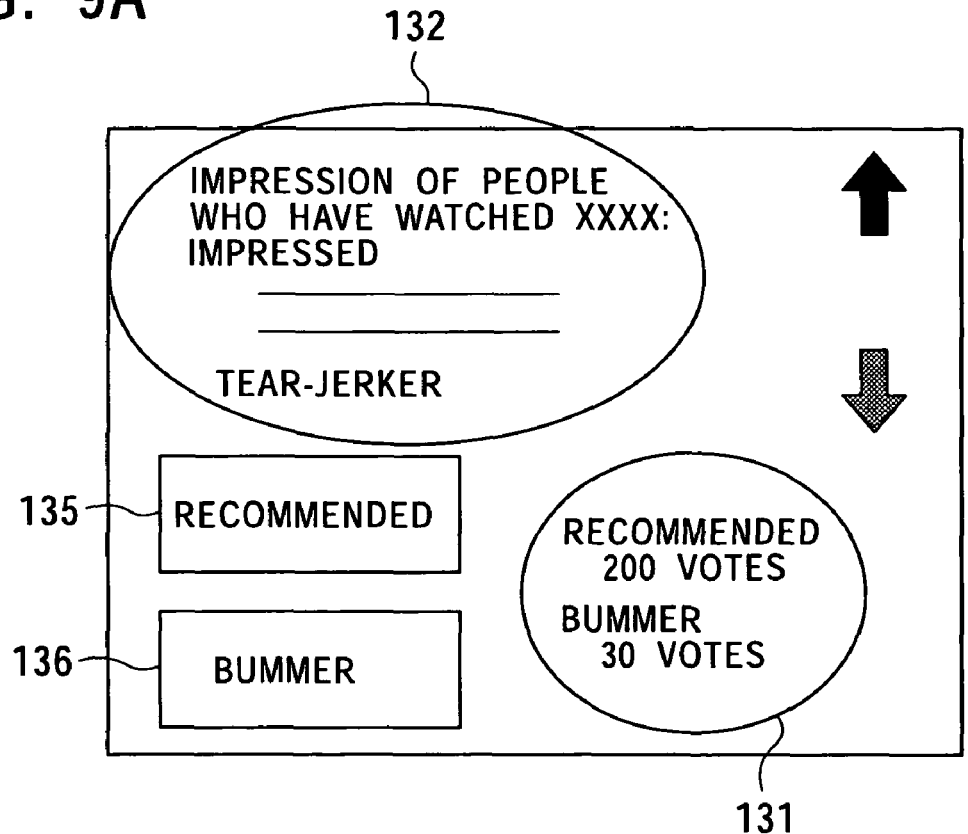
Figure 9B:
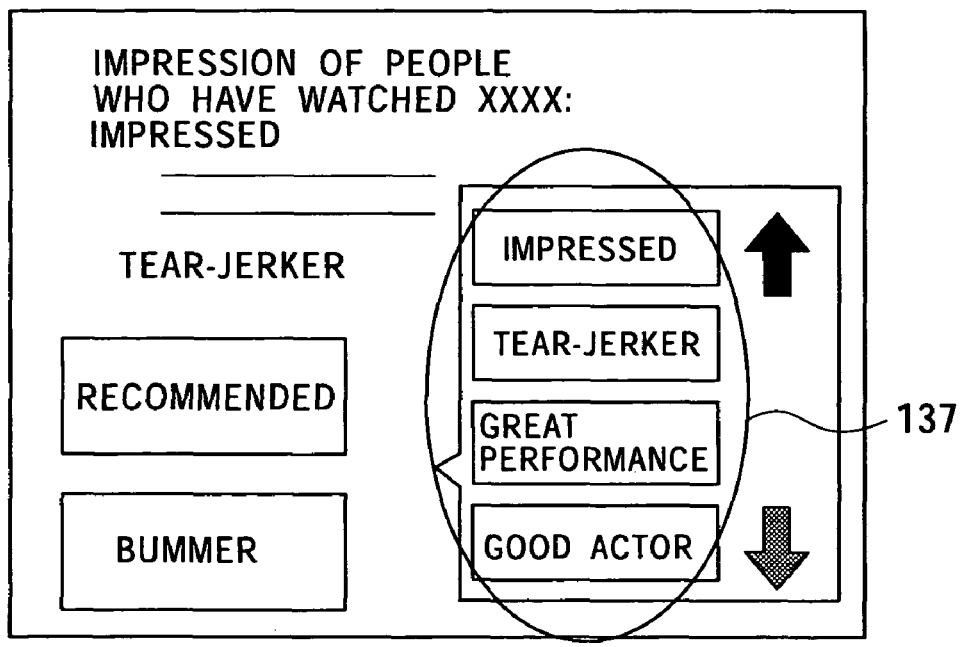

When the broadcast program receiving apparatus 10 determines that the broadcast program has already been watched (after watching) in Step S106, additional buttons for polling the user's vote with respect to evaluation of the broadcast program is displayed on the evaluation information display screen by the OSD circuit 28 (Step S111). For example, as shown in FIG. 9A, a Recommended button 135 and a Bummer button 136 are displayed at the bottom part of the evaluation information display screen. The user polls his/her vote by selecting either the Recommended button 135 or the Bummer button 136 through the button operation of the remote control 26 to designate it. The broadcast program receiving apparatus 10 determines whether a poll has been taken, based on the signal from the remote control 26 received by the remote control light-receiving unit 25 (Step S112). When a poll has not been taken, the process terminates. When the broadcast program receiving apparatus 10 determines that a poll has been taken in Step S112, additional evaluation comments 137 are displayed on the evaluation information display screen displayed by the OSD circuit 28 (Step S113), as shown in FIG. 9B.

The user selects a favorite evaluation comment from among the displayed evaluation comments 137 and designates it using the remote control 26. The broadcast program receiving apparatus 10 receives the signal from the remote control 26 by the remote control light-receiving unit 25 and determines whether one of the evaluation comments 137 has been selected (Step S114). When one of the evaluation comments 137 has been selected, the selected evaluation comment is added to the user poll results in Step S112 (Step S115). When none of the evaluation comments 137 has been selected, the processing in Step S114 is skipped and the process proceeds to Step S116. In such a case, only the poll results in Step S112 become effective as an evaluation result by the user.

The evaluation result by the user processed as described above (the poll results in Step S112 and the evaluation comments or the poll results in Step S114) is transmitted to the server 40 via the cell phone antenna 23 connected to the cell phone unit 22, according to an instruction from the user to send the evaluation result, which is given using the remote control 26 (Step S116). The broadcast program receiving apparatus 10 determines whether the evaluation result by the user is received by the server 40 (Step S117), and it repeats the transmission of the evaluation result in Step S116 when the reception by the server 40 is not confirmed. When the reception is confirmed, the process terminates.

As described above, with the broadcast program receiving apparatus 10, the user can easily determine whether he or she wishes to watch the broadcast program before watching it, based on the evaluation data concerning the broadcast program recorded in advance, which data is acquired from the server 40 at viewing. The evaluation result by the user of the broadcast program is registered on the server 40. The evaluation result registered as mentioned above is incorporated into the existing evaluation data as new data and is utilized as the evaluation data supplied to other users.

Figure 10:
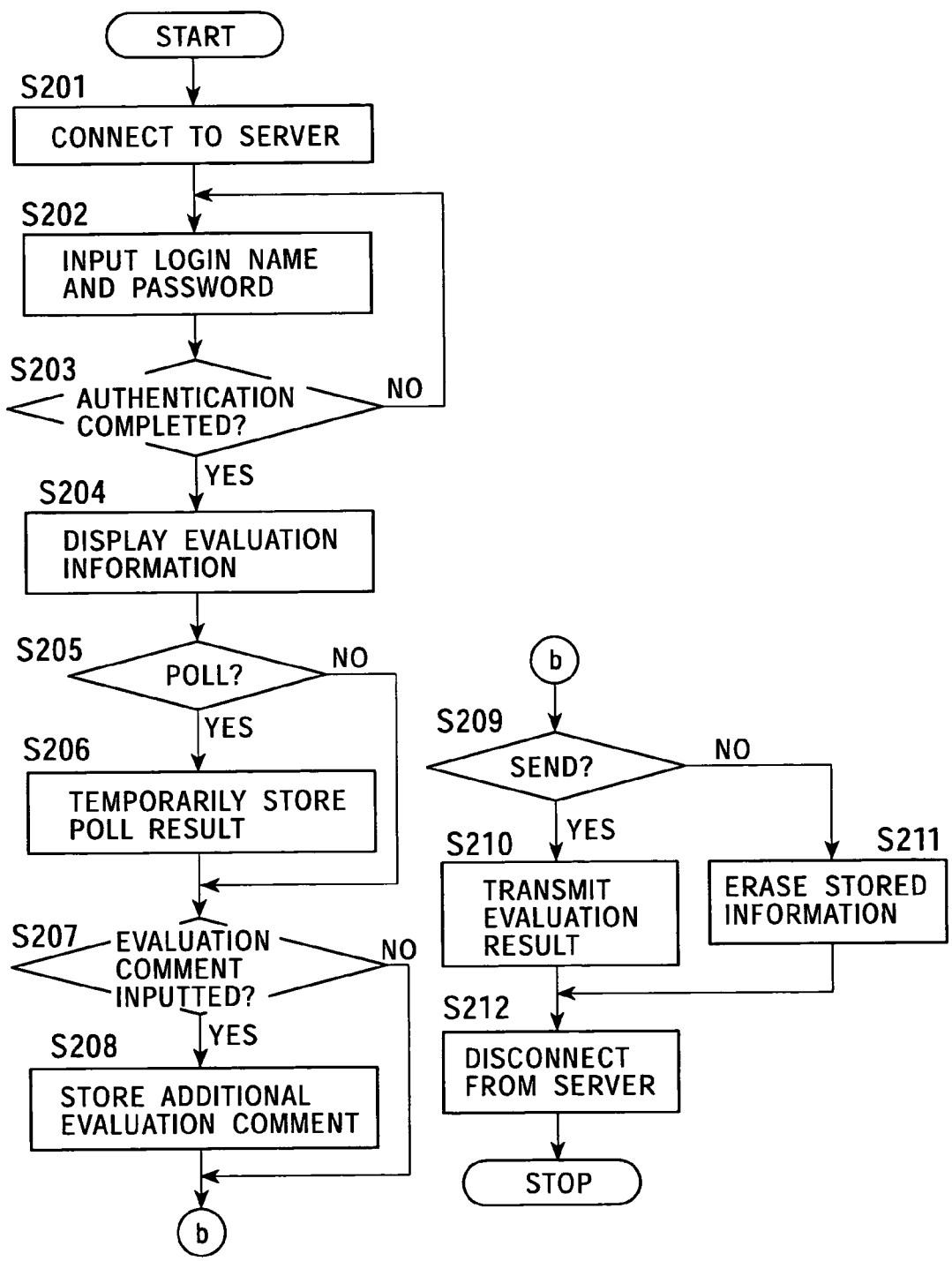
FIG. 10 is a flowchart showing the transmission and reception flow of evaluation data between a cell phone 66 or a PC 62 and the server 40.

FIG. 10 is a flowchart showing the process flow for transmission to and reception from the server 40 of the evaluation information using the PC 62 or the cell phone 66.

First, the user connects the PC 62 or the cell phone 66 to the server 40 (Step S201). When the user dials a specified telephone number, the cell phone 66 can connect to the second cellular relay station 64 via an antenna 67 for the cell phone 66 and an antenna 65 for the second cellular relay station 64. Then, the cell phone 66 connects to the server 40 for a cell phone site having a predetermined URL (uniform resource locator) via the second cellular relay station 64 over the Internet. In contrast, the PC 62 connects to the ISP 63 that is used by the user over a phone line or a leased line when instructed by the user or by automatic settings, and then connects to the server 40 for a PC site having a predetermined URL over the Internet.

When the server 40 requests that the user input a login name and a password on the PC 62 or the cell phone 66, the user inputs the login name and the password in response to the request (Step S202). The data concerning the login name and the password inputted on the PC 62 or the cell phone 66 is transmitted to the server 40. As a result, the PC 62 or the cell phone 66 determines whether the login to the server 40 by the user is authenticated based on the data transmitted from the server 40 (Step S203). When the login to the server is not authenticated, inputting of the login name and the password by the user in Step S202 is repeated. When the login is granted and the authentication is completed, an evaluation information form shown in FIG. 11 is displayed on the PC 62 or the cell phone 66 (Step S204).

Figure 11:
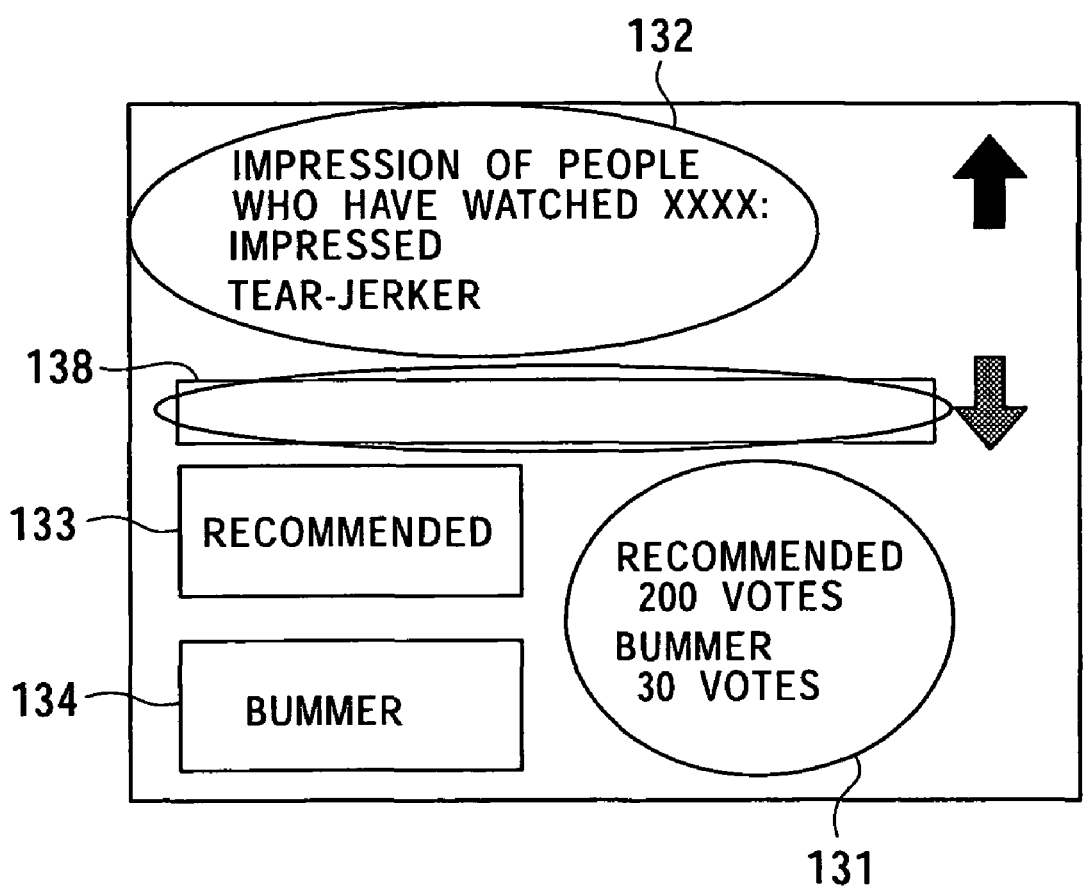
FIG. 11 shows an example of an evaluation information form.

The evaluation information form shown in FIG. 11 includes the poll results 131 and the evaluation comments 132, as in the evaluation information display screen shown in FIGS. 9A and 9B. The Recommended button 133 and the Bummer button 134 are also included in this form so that a user who has already watched the broadcast program can evaluate it. After the user votes for the broadcast program to be evaluated, the PC 62 or the cell phone 66 determines whether the user has polled his/her vote (Step S205). When the PC 62 or the cell phone 66 determines that the user has correctly polled his/her vote, the PC 62 or the cell phone 66 temporarily stores the poll results in a memory therein so as to transmit the poll results to the server 40 together with the evaluation comments described later (Step S206). When the PC 62 or the cell phone 66 determines that the user has not polled his/her vote correctly or when the user has not polled his/her vote at all, the processing in Step S206 is skipped.

Figure 12:
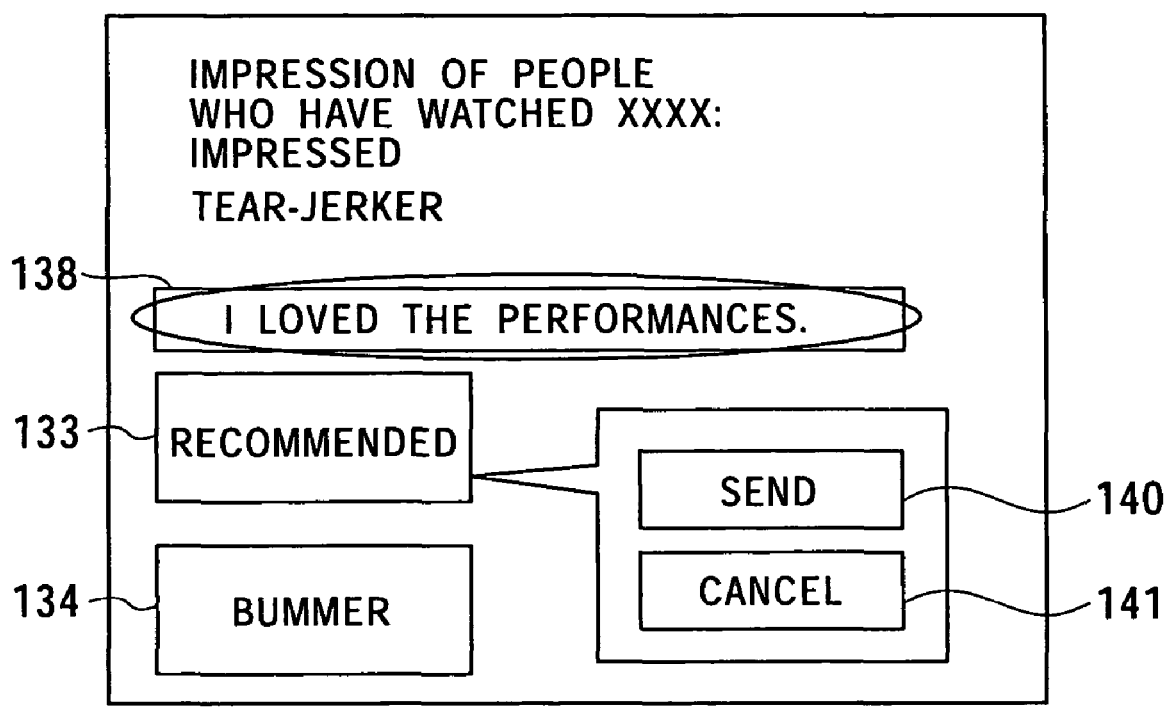
FIG. 12 shows an example of the evaluation information form with a send information form added.

Next, the PC 62 or the cell phone 66 determines whether the user has inputted evaluation comments in an input field 138 in the evaluation information form shown in FIG. 11, as shown in FIG. 12 (Step S207). Since character input can be relatively easily performed with the PC 62 or the cell phone 66, a comment format for inputting a text sentence that the user prepared by himself can be employed instead of selecting the evaluation comment as in the broadcast program receiving apparatus 10. When the PC 62 or the cell phone 66 determines that the evaluation comments have been inputted, the evaluation comments, together with the poll results stored in Step S206, are temporarily stored in a memory (not shown) in the PC 62 or the cell phone 66 (Step S208). When the PC 62 or the cell phone 66 determines that the evaluation comments have not been inputted, the processing in Step S208 is skipped.

Then, the PC 62 or the cell phone 66 determines whether evaluation result data is to be sent to the server 40 (Step S209). For example, after the user has inputted his/her evaluation result, the evaluation information form, with a send information form added thereto, is displayed as shown in FIG. 12. The user selects a Send button 140 or a Cancel button 141 in the send information form. When the PC 62 or the cell phone 66 determines that the evaluation result data is to be sent to the server 40, the evaluation result data temporarily stored in the memory in the PC 62 or the cell phone 66 is sent to the server 40 (Step S210). In contrast, when the PC 62 or the cell phone 66 determines that the evaluation result data is not to be sent to the server 40 owing to the selection of the Cancel button 141 by the user, the evaluation result data temporarily stored in the memory in the PC 62 or the cell phone 66 is erased (Step S211). When the PC 62 or the cell phone 66 has received an acknowledgement of receipt of the evaluation result data from the server 40, the server 40 is disconnected (Step S212) and the process terminates.

As described above, the transmission and reception of the evaluation information concerning the broadcast program can be performed using a conventional apparatus that the user normally uses, such as the PC 62 or the cell phone 66, without using the broadcast program receiving apparatus 10, if the evaluation information form is provided in the server 40. With this method, the user can transmit to and receive from the server 40 the evaluation information without purchasing a new apparatus.

Figure 13:
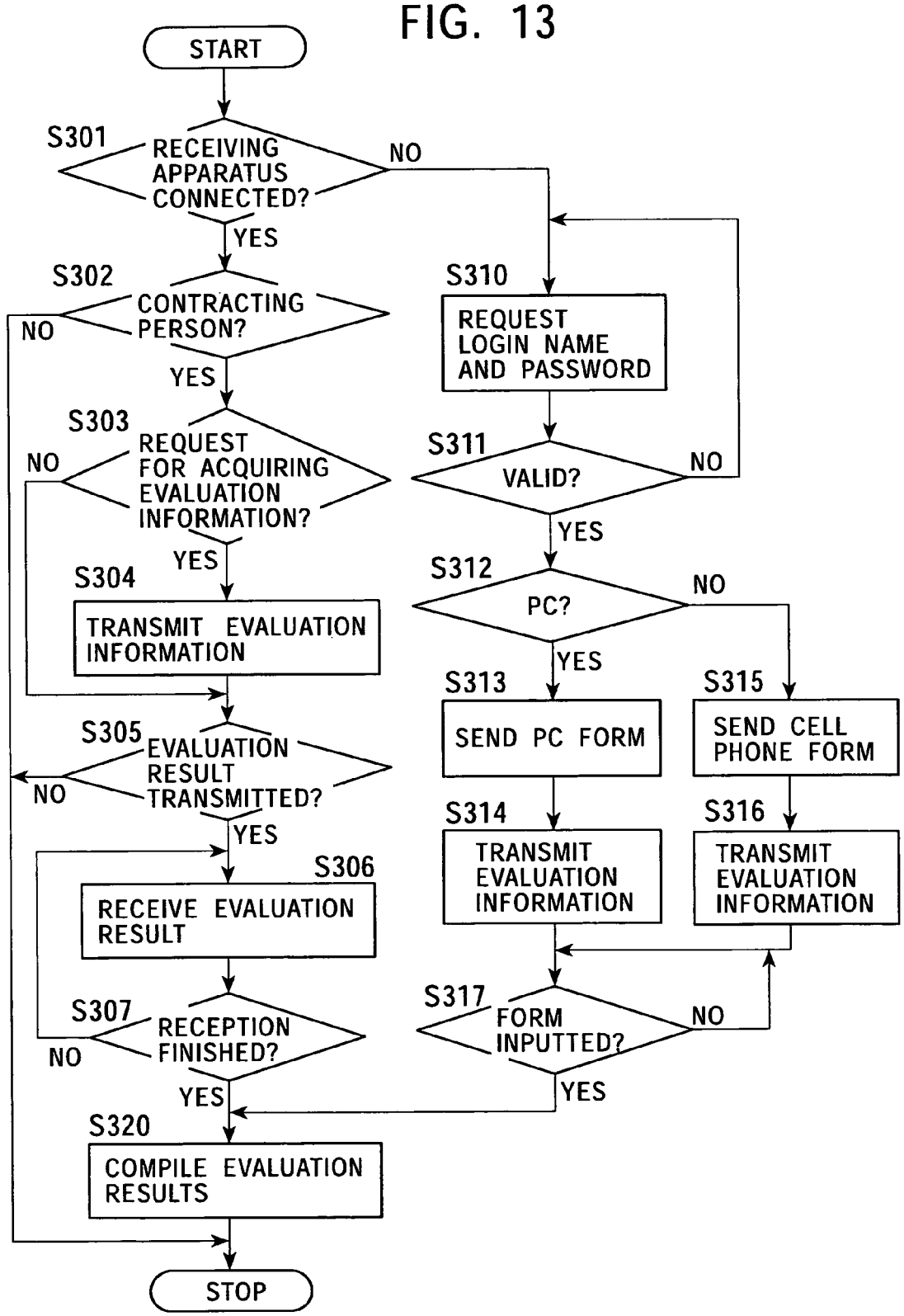
FIG. 13 is a flowchart showing the process flow in the server 40.

Data transmission and reception between the server 40 and each terminal will be described specifically. FIG. 13 is a flowchart showing the process flow in the server 40.

In order to provide services for transmitting the evaluation data concerning the broadcast program and for acquiring the evaluation results, which services are appropriate for each terminal (the broadcast program receiving apparatus 10, the cell phone 66, or the PC 62), the server 40 identifies the kind of user terminal when the user terminal is connected thereto. In other words, the server 40 determines whether it is connected to the broadcast program receiving apparatus 10 when an external connection is realized (Step S301). Evaluation data transmission and reception between the server 40 and the broadcast program receiving apparatus 10 is performed through the congestion control section 45 and the congestion control management section 46 in the server 40 shown in FIG. 3. The data is transmitted and received via the cellular relay station 60 connected to the server 40 and an antenna 61 connected to the relay station 60, as shown in FIG. 1. When the server 40 determines that it is not connected to the broadcast program receiving apparatus 10 in Step S301, the processing in Step S310 described later is performed.

When the server determines that it is connected to the broadcast program receiving apparatus 10, it confirms in the customer management section 43 whether a contracting user of a service in question is using the apparatus (Step S302). This confirmation can be performed based on, for example, customer identification data transmitted from the broadcast program receiving apparatus 10 together with a connection request. The confirmation of whether the contracting user is using the apparatus is useful when the evaluation information providing service is provided as a pay service. Since such a confirmation makes it possible to recognize that a particular user has polled his/her vote with respect to the evaluation of a specified broadcast program, a process for preventing duplicate registration on the server 40 of the evaluation result of the same broadcast program by the same person can be performed. When the server 40 determines that the apparatus is not being used by a contracting user in Step S302, the process terminates. When the server 40 determines that the apparatus is being used by a contracting user, it determines whether acquisition of the evaluation information concerning the broadcast program is requested (Step S303).

When the server 40 determines that the apparatus is being used by a contracting user in Step S302, broadcast program evaluation data having the identification information corresponding to the request from the broadcast program receiving apparatus 10 is extracted from among the evaluation data that is obtained by compiling the evaluation results of each broadcast program stored in the server 40. This processing is performed by the application management section 47 in the server 40. The extracted evaluation data is transmitted to the broadcast program receiving apparatus 10 as the evaluation information (Step S304). When the server determines that the evaluation results are not requested in Step S303, the processing in Step S304 is skipped and the process proceeds to Step S305 described later.

When the user 70 is billed for the service charge based on the contract between the user 70 and the service provider 72, along with the process for transmitting the evaluation data from the server 40, the processed data is transmitted to the charge management section 42 in the server 40 to calculate the service charge. The server 52 of the financial institution 74 that the user 70 designates is billed for the service charge through the payment GW section 44. After the payment by the user 70 is finished, the service charge is credited to the payment GW section 44 by the server 52 of the financial institution 74.

Next, the server 40 determines whether the evaluation results have been transmitted from the broadcast program receiving apparatus 10 (Step S305). When the user has not watched the broadcast program and the evaluation results have not been transmitted, the process terminates. When the user has already watched the broadcast program, the server 40 receives the evaluation results thereof (Step S306). The server 40 determines whether the reception of the evaluation results is finished (Step S307). When the reception is not finished, the reception processing in Step S306 is repeated until the reception completes. The evaluation results transmitted to the server 40 is registered in the server 40 and is compiled together with other evaluation results (Step S320) to be used as the evaluation data. The evaluation data may be transmitted again to the broadcast program receiving apparatus 10 of the user based on the compilation result obtained here.

The case where the server 40 determines that the terminal connected thereto is not the broadcast program receiving apparatus 10 in Step S301 will be described. When the server 40 determines that the connected terminal is not the broadcast program receiving apparatus 10 in Step S301 in FIG. 13, that is, when it determines that the PC 62 or the cell phone 66 is connected to the internet gateway section 41 in the server 40 over the Internet 50, it requests the login name and the password of the connected user (Step S310).

The server 40 compares the information inputted by the user with registration information of the user stored in the customer management section 43 and so on in the server 40 and determines for authentication whether the inputted information is valid (Step S311). Since the data is directly transmitted to and received from the server 40 when the broadcast program receiving apparatus 10 is connected thereto, such an authentication procedure is not required; whereas it is preferable to perform such an authentication procedure for security when the PC 62 or the cell phone 66 is used. When the information inputted in response to the request is not valid, the input request in Step S310 is repeated until the server 40 determines that the information is valid.

When the server 40 determines that the inputted login name and the password are valid, it determines whether the terminal connected thereto is the PC 62 connected via ISP 63 over the Internet (Step S312).

When the server 40 determines that the connected terminal is the PC 62, it sends an evaluation information form, as shown in FIG. 12, in accordance with the function of the PC 62 (Step S313). The server transmits the evaluation information concerning the broadcast program as additional information in the image input form (Step S314).

When the server 40 determines that the connected terminal is not the PC 62 in Step S312, it determines that the connected terminal is the cell phone 66 and sends an image input form compatible with the functions of the cell phone 66 (Step S315). As in the PC 62, the evaluation information form as shown in FIG. 12 may be used. However, since less data can be processed in the cell phone 66 than in the PC 62 and input operation by the user is limited therein, use of an image input form which reflects such facts is preferable. The server 40 transmits the evaluation information concerning the broadcast program as additional information in the image input form (Step S316).

The server 40 determines whether queued evaluation result data, which is received from the user, is correctly inputted (Step S317). When the server 40 determines that the evaluation information is not correctly inputted, it waits for the user to input again. When the server 40 determines that the evaluation result data is correctly received, and when it determines that the evaluation result data inputted from the PC or the cell phone 66 is correctly inputted in Step S317, the server 40 compiles the evaluation result data (Step S320) and terminates the process.

Accordingly, since the server 40 has the evaluation data concerning the broadcast program, it can efficiently provide the information required by the user by sending the evaluation data in response to the request from the user terminal. The server incorporates the evaluation results registered from each terminal into the existing evaluation data as new data and utilizes it as the evaluation data provided to other users. At this time, with a method in which the process for compiling the evaluation results per broadcast program is performed each time the evaluation result data is transmitted from the user terminal, the evaluation information stored in the server 40 is brought up-to-date and also the number of evaluations increases, thereby providing evaluation information with high reliability. Although each process in the server 40 described above may be performed by one server, it may be performed by a plurality of function-distributed servers.

As described above, the broadcast program evaluation processing system, which includes the server 40 and each terminal (the broadcast program receiving apparatus 10, the PC 62, and/or the cell phone 66), according to one embodiment of the present invention, successively collects and processes the evaluation information concerning the broadcast program in a short period of time. Thus, evaluation information useful to the user is efficiently and immediately provided when needed.

Although, according to the above embodiment of the present invention, the server 40 provides the evaluation information form to the PC 62 or the cell phone 66, provision of the evaluation information form may be omitted. For example, a method in which a program for displaying the evaluation information form is introduced into the PC 62 or the cell phone 66, which receives from the server 40 only the information (the poll results or the evaluation comments) to be displayed in the evaluation information form, may be realized.

The user may poll his/her vote only after he or she has watched the broadcast program. The broadcast program may be evaluated immediately after the regular broadcasting thereof or the recorded broadcast program may be played back and then evaluated. In this case, the user transmits the evaluation results using the broadcast program receiving apparatus 10, the PC 62, the cell phone 66, or the like, and the server 40 of the service provider 72 performs a process for providing the user 70 with an evaluation incentive in response to the transmission of the evaluation results by the user.

In an evaluation information processing service of the broadcast program, the service provider may provide the evaluations of the broadcast program by the public, critics, and so on to the user as an additional service.

A service providing scheme in which the broadcast program is recorded on the server on the Internet and the user obtains the recorded broadcast program and the evaluation information thereof via the terminal may be used. Furthermore, a scheme for providing the broadcast program and also transmitting the evaluation data to the user may be realized. The service may be provided, for example, through an interactive television.

The broadcast program to be handled in the evaluation information processing service of the broadcast program is not limited to television broadcasting of satellite digital broadcasting or terrestrial analog and digital broadcasting: it may be image data provided in cable broadcasting or over the Internet.

As described above, according to the present invention, a broadcast program processing apparatus and so on in which the user can obtain the evaluation information supplied by others who have already watched the broadcast program before watching the recorded broadcast program can be realized.

The invention claimed is:
1. A broadcast program processing apparatus comprising:
a recording unit for recording a broadcast program;
an acquiring unit for acquiring evaluation data concerning the broadcast program via a network; and
an outputting unit for outputting the acquired evaluation data in connection with the recorded broadcast program,
wherein when the broadcast program processing apparatus transmits evaluation data concerning the broadcast program via the network to a server, an authentication procedure is conducted depending on a connection type between the broadcast program processing apparatus and the server, wherein when the connection type indicates a connection type of a TV receiver, the authentication is not executed, wherein when the connection type indicating a connection type of a mobile phone, the authentication procedure is executed, wherein the acquiring unit receives an evaluation form of the recorded broadcast program via the network, a format of the evaluation form being selected from a PC form or a Cell Phone form according to a type of the broadcast program processing apparatus, wherein the outputting unit determines whether the recorded broadcast program has been played back and outputs operation buttons with the acquired evaluation data according to a determination result, wherein when the outputting unit determines that the recorded broadcast program has not been played back, the outputting unit outputs operation buttons relating to playback operations and when the outputting unit determines that the recorded broadcast program has been played back, the outputting unit outputs operation buttons relating to evaluation operations, and wherein a user decides whether to play back the recorded broadcast program based on the outputted evaluation data, utilizing the operation buttons.

2. The broadcast program processing apparatus according to claim 1,
wherein the recording unit stores the broadcast program as digital data in a memory, and
wherein the acquiring unit acquires the evaluation data after transmitting identification information concerning the broadcast program stored in the memory via the network.

3. The broadcast program processing apparatus according to claim 1, further comprising a transmitting unit for transmitting, via the network, evaluation result data concerning the broadcast program after the user watches the broadcast program.

4. A computer system comprising:
acquiring means for acquiring evaluation result data concerning a broadcast program from a plurality of viewers;
compiling means for obtaining evaluation data by compiling the evaluation result data; and
transmitting means for transmitting the evaluation data to a user terminal in response to a request from the user terminal of a user who intends to record and watch the broadcast program,
wherein when a user sends evaluation data concerning the broadcast program to the computer system by using a predetermined apparatus, an authentication procedure is conducted depending on a connection type between the predetermined apparatus and the computer system,
wherein when the connection type indicates a connection type of a TV receiver, the authentication is not executed,
wherein when the connection type indicating a connection type of a mobile phone, the authentication procedure is executed,
wherein the transmitting means transmits an evaluation form of the broadcast program to the user terminal, a format of the evaluation form being selected from a PC form or a Cell Phone form according to a type of the user terminal,
wherein when the transmitting means determines that the recorded broadcast program has not been played back, the transmitting means outputs information of operation buttons relating to playback operations and when the transmitting means determines that the recorded broadcast program has been played back, the transmitting means outputs information of operation buttons relating to evaluation operations, and
wherein the user decides whether to play back a recorded broadcast program based on the evaluation data of the recorded broadcast program, utilizing the operation buttons.

5. The computer system according to claim 4, further comprising identification information acquiring means for acquiring from the user terminal identification information concerning the broadcast program that the user intends to watch,
wherein the transmitting means transmits the evaluation data concerning the broadcast program to the user terminal based on the acquired identification information.

6. The computer system according to claim 4,
wherein the transmitting means periodically transmits the evaluation data concerning a plurality of broadcast programs to the user terminal.

7. An evaluation processing system of a broadcast program, comprising:
a terminal for audio-visually processing a recorded broadcast program; and
a server capable of transmitting to and receiving from the terminal evaluation data concerning the broadcast program,
wherein the server includes:
storing means for storing the evaluation data provided by a viewer concerning the broadcast program; and
server-side transmitting means for transmitting to the terminal the stored evaluation data in response to a request from the terminal, and
wherein the terminal includes:
acquiring means for acquiring the evaluation data from the server; and
outputting means for outputting the acquired evaluation data in connection with identification information concerning the recorded broadcast program,
wherein when the terminal transmits evaluation data concerning the broadcast program via the network to the server, an authentication procedure is conducted depending on a connection type between the terminal and the server,
wherein when the connection type indicates a connection type of a TV receiver, the authentication is not executed,
wherein when the connection type indicating a connection type of a mobile phone, the authentication procedure is executed,
wherein the server-side transmitting means transmits an evaluation form of the recorded broadcast program to the terminal via the network, a format of the evaluation form being selected from a PC form or a Cell Phone form according to a type of the terminal,
wherein when the outputting means determines that the recorded broadcast program has not been played back, the outputting means outputs operation buttons relating to playback operations and when the outputting means determines that the recorded broadcast program has been played back, the outputting means outputs operation buttons relating to evaluation operations, and
wherein a user of the terminal decides whether to play back the recorded broadcast program based on the outputted evaluation data, utilizing the operation buttons.

8. The evaluation processing system of a broadcast program according to claim 7, wherein the terminal further includes:
inputting means for inputting an evaluation result of the broadcast program after the user watches the broadcast program; and terminal-side transmitting means for transmitting to the server data concerning the inputted evaluation result.

9. The evaluation processing system of a broadcast program according to claim 7,
wherein the server further includes authentication means for authenticating that a user is registered in the server in response to the request from the terminal, and
wherein the evaluation data concerning the broadcast program is transmitted to and received from an authenticated user.

10. The evaluation processing system of a broadcast program according to claim 9,
wherein the server includes customer management means for adding privilege points to information, which is stored in the server, concerning the user of the terminal which has transmitted evaluation result data concerning the broadcast program that has been watched.

11. An evaluation processing method comprising:
a step of acquiring, via the network, evaluation data concerning a broadcast program provided by a viewer; and
a step of outputting the evaluation data corresponding to the broadcast program, together with information identifying the broadcast program,
wherein the acquiring step receives an evaluation form of the broadcast program via the network, a format of the evaluation form being selected from a PC form or a Cell Phone form according to a type of a broadcast program processing apparatus,
wherein when the broadcast program processing apparatus transmits evaluation data concerning the broadcast program via the network to a server, an authentication procedure is conducted depending on a connection type between the broadcast program processing apparatus and the server,
wherein when the connection type indicates a connection type of a TV receiver, the authentication is not executed,
wherein when the connection type indicating a connection type of a mobile phone, the authentication procedure is executed,
wherein the outputting step determines whether the recorded broadcast program has been played back and outputs operation buttons with the acquired evaluation data according to a determination result,
wherein when the outputting step determines that the recorded broadcast program has not been played back, the outputting step outputs operation buttons relating to playback operations and when the outputting step determines that the recorded broadcast program has been played back, the outputting step outputs operation buttons relating to evaluation operations, and
wherein the viewer of the computer system decides whether to play back the recorded broadcast program based on the outputted evaluation data, utilizing the operation buttons.

12. The evaluation processing method according to claim 11,
wherein the information identifying the broadcast program includes title information of the broadcast program.

* * * * *